(12) United States Patent
Moon

(10) Patent No.: US 7,537,720 B2
(45) Date of Patent: May 26, 2009

(54) PCM MOLD AND BATTERY HAVING THE SAME

(75) Inventor: Ki eob Moon, Seoul (KR)

(73) Assignee: LG Chem, Ltd. (KR)

( * ) Notice: Subject to any disclaimer, the term of this patent is extended or adjusted under 35 U.S.C. 154(b) by 808 days.

(21) Appl. No.: 11/006,133

(22) Filed: Dec. 7, 2004

(65) Prior Publication Data
US 2005/0122667 A1    Jun. 9, 2005

(30) Foreign Application Priority Data
Dec. 8, 2003  (KR) .................. 10-2003-0088528
Jan. 14, 2004 (KR) .................. 10-2004-0002625

(51) Int. Cl.
B29C 45/14 (2006.01)
H01M 2/08 (2006.01)

(52) U.S. Cl. .................. 264/272.21; 429/7; 429/184

(58) Field of Classification Search ............... 429/7, 429/162, 163, 184, 185; 264/272.21
See application file for complete search history.

(56) References Cited

U.S. PATENT DOCUMENTS 6,803,144 B2 * 10/2004 Hovi et al. ............... 429/7 X
6,924,059 B1 * 8/2005 Kawakami et al. ........ 429/162
7,037,608 B2 * 5/2006 Nishimura et al. ............ 429/7
7,297,440 B2 * 11/2007 Watanabe et al. .......... 429/163
2002/0142195 A1 * 10/2002 Ehara ........................ 429/7
2003/0141841 A1 * 7/2003 Kawabata et al. .......... 320/112

* cited by examiner

Primary Examiner—Stephen J. Kalafut
(74) Attorney, Agent, or Firm—Cantor Colburn LLP

(57) ABSTRACT

The present invention provides a protection circuit module (PCM) insert injection mold, and a battery having the same. The PCM insert injection mold is made by inserting a PCM, including a plate having protection circuit formed thereon and connection terminals and optionally leads, with the protection circuit plate, connection terminals and leads being electrically connected, into an inner space of a mold, and injecting a molten resin into the inner space of the mold such that the leads are partially exposed to the outside where the PCM includes the leads, or such that the connection terminals are partially exposed to the outside where the PCM does not include the leads. Since the PCM is prepared by insert injection molding under the condition that the protection circuit and battery cell are not connected, i.e., that power is not applied to a battery, the PCM can be molded using general resins, is electrically stable, does not require a coating step for preventing short circuit, and is rare electrically damaged.

6 Claims, 4 Drawing Sheets

PRIOR ART

[FIG. 5]
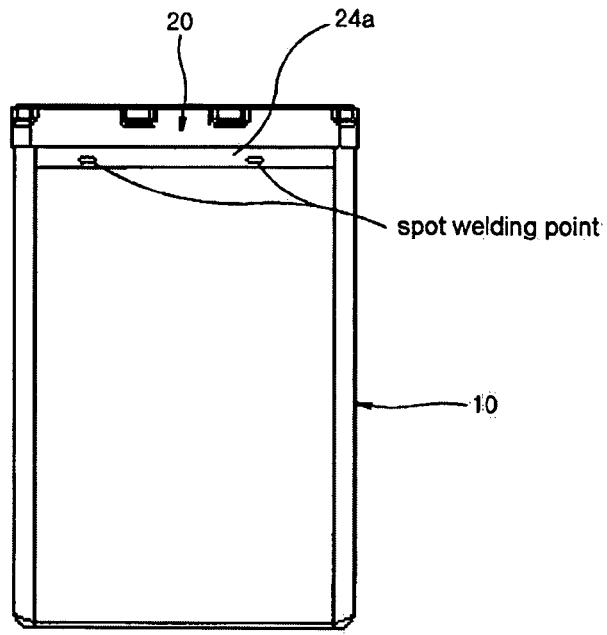
[FIG. 6]
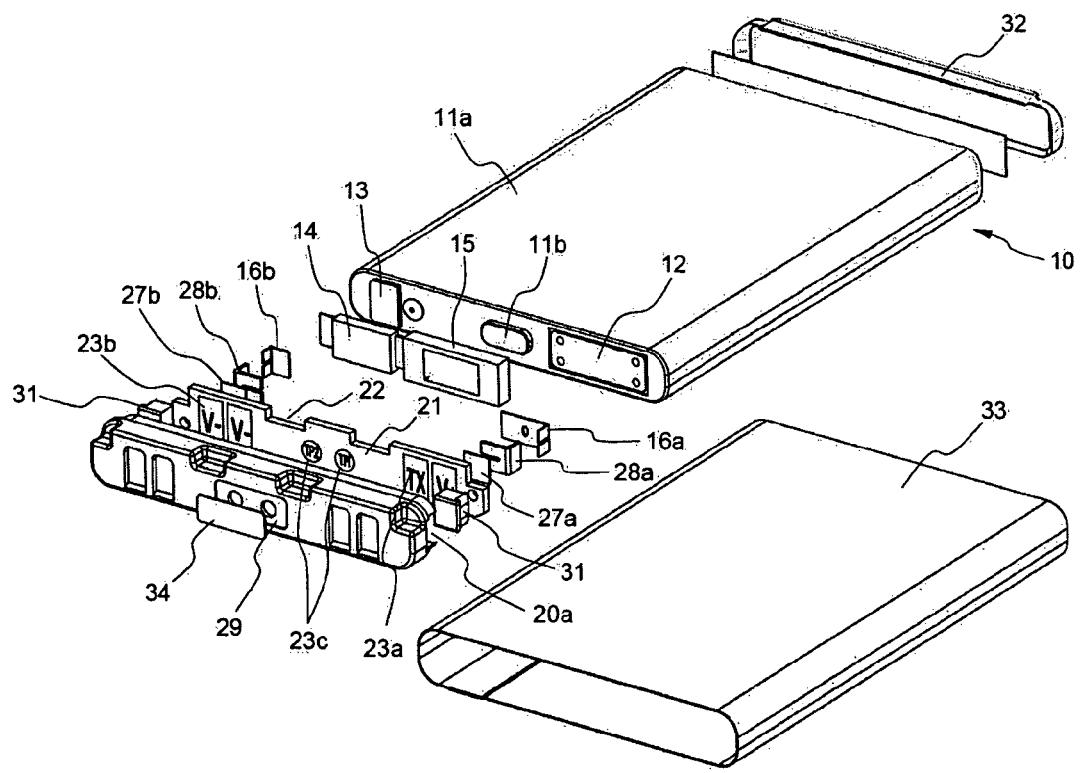

[FIG. 7]
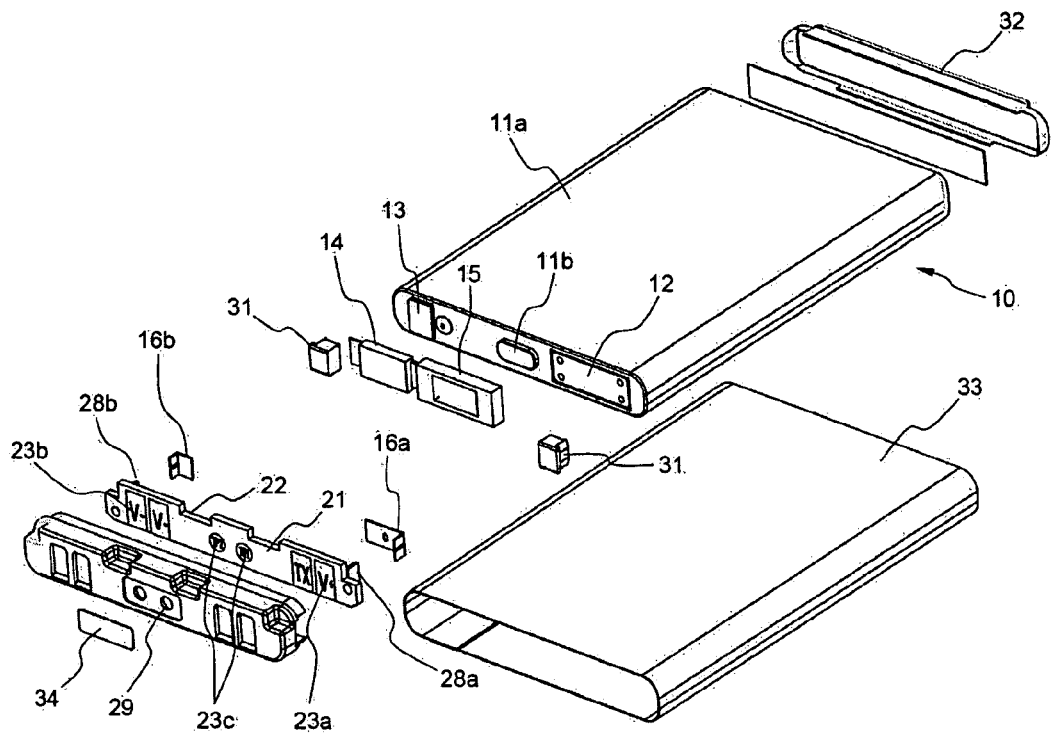
[FIG. 8]
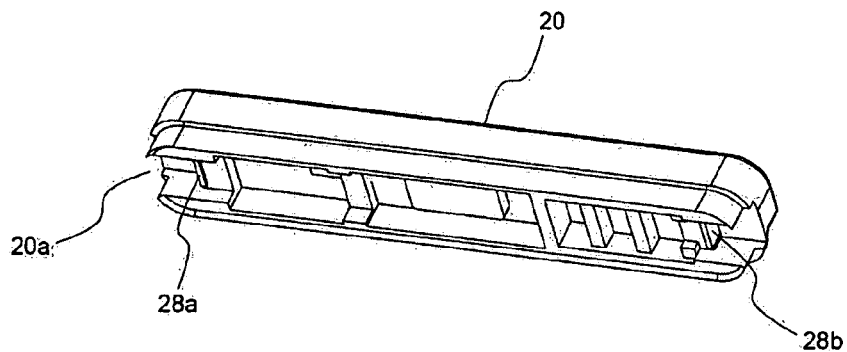
[FIG. 9]
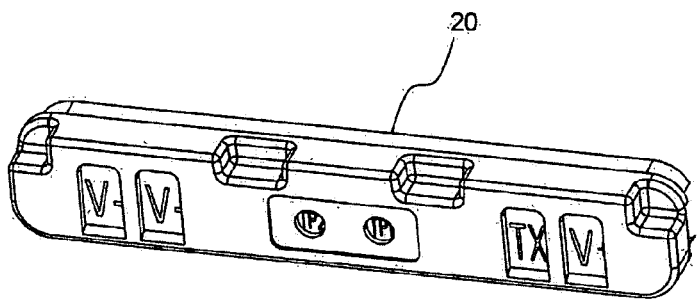

PCM MOLD AND BATTERY HAVING THE SAME

TECHNICAL FIELD

The present invention relates to a protection circuit module (PCM) insert injection mold comprising a protection circuit plate provided with a protection circuit thereon and connection terminals and optionally leads, and a battery having the PCM insert injection mold.

BACKGROUND ART

Generally, a battery comprises a battery cell and a PCM. The battery cell includes an electrode assembly being composed of positive electrodes, negative electrodes, and separators, and a case for containing the electrode assembly such that electrode terminals of the electrode assembly are protruded therefrom and a designated quantity of electrolyte is contained therein. The PCM includes a plate installed outside the battery cell and provided with a protection circuit electrically connected to the electrode terminals of the battery cell, and external input/output terminals installed on a side of the protection circuit plate opposite to the battery cell and connected to an external device (for example, a wireless terminal, a notebook computer, or an electric car).

Hereinafter, with reference to FIGS. 1, 2 and, one example of methods for manufacturing the above-described battery will be described in detail.

A battery 1 including a PCM 2 and a battery cell 3, which are integrated with each other, is manufactured by injecting a molten resin into an inner space 5 of a mold including a pair of top mold 4a and bottom mold 4b through an inlet 4aa of the top mold 4a, under the condition that a connection terminal 2aa of a protection circuit plate 2a of the PCM 2 and a lead 3a of the battery cell 1 are connected.

However, the above conventional method wherein the battery cell 3 containing the electrode assembly and the PCM 2 are located in the inner space 5 of the mold and are fixed by the molten resin, has several problems as follows.

First, since the manufacture of the battery is performed while the circuit operates, when the battery cell 3 and the PCM 2 are integrated with each other, the battery cell 3 and the PCM 2 contact the mold, thereby increasing the possibility of short circuit.

Second, when the top mold 4a and the bottom mold 4b are connected under the condition that the battery cell 3 and the PCM 2 are temporarily connected to each other in the inner space 5 of the mold, pressure is applied to the outer surface of the battery cell 3, particularly along the thickness of the battery cell 3, thereby causing the battery cell 3 to be deformed.

Third, when the molten resin of high-temperature and high-pressure states is injected into the inner space 5 of the mold, the injected molten resin distorts the positions of the battery cell 3 and the PCM 2, thereby causing failures.

Fourth, the battery cell 3 in the mold, which reaches a high temperature, changes characteristics of the battery and causes explosion of the battery. Further, where pressure is applied to a battery case of the battery cell 3 in the mold, the pressure is imposed on a welding portion between a battery can and a top cap of the battery can, thereby generating vents at the welding portion.

Fifth, since the manufacture of the battery is performed while that power is applied to the circuit, the output terminal needs to be coated in order to prevent short circuit, thereby supplying inconvenience to workers.

Accordingly, since the conventional method for manufacturing the battery has the above many problems, a technique for solving the above problems is strongly required.

DISCLOSURE

Technical Problem

Therefore, the present invention has been made in view of the above problems, and it is an object of the present invention to provide a protection circuit module (PCM) insert injection mold and a battery having the same, in which the PCM insert injection mold is prepared by insert injection molding only PCM separately from a battery cell with a molten resin injected into a mold, and is then connected to the battery cell to form a battery.

Technical Solution

In accordance with one aspect of the present invention, the above and other objects can be accomplished by the provision of a protection circuit module (PCM) insert injection mold prepared by inserting a protection circuit module which includes a plate having a protection circuit formed thereon, connection terminals and optionally leads into an inner space of mold, with the protection circuit plate, connection terminals and optionally leads being electrically connected, and injecting a molten resin into the inner space of mold such that the leads are partially exposed to the outside where the PCM includes the leads, or such that the connection terminals are partially exposed to the outside where the PCM does not include the leads.

In accordance with another aspect of the present invention, there is provided a method for preparation of a battery, comprising the step of directly connecting exposed parts of the connection terminals in the PCM insert injection mold to corresponding electrode terminals of a battery cell, or connecting the exposed parts of optionally the leads to the corresponding electrode terminals of the battery cell.

In accordance with yet another aspect of the present invention, there is provided a battery comprising a PCM insert injection mold.

Advantageous Effects

The PCM is prepared by insert injection molding under the condition that a protection circuit and battery cell are not connected, i.e., that power is not applied to a battery, thus the PCM can be molded using general resins, is electrically stable, does not require a coating step for preventing short circuit, and is rare electrically damaged. Accordingly, even when the PCM is molded by a molten resin of high-temperature and high-pressure state as well as a molten resin of low-temperature and low-pressure state, failures of the PCM are rare generated. That is, molding resins of low-temperature and low-pressure state, such as polyamide resin or polyolefin resin, and molding resins of high-temperature and high-pressure state, such as polyethylene rein or epoxy resins, can be employed in the insert injection molding process according to the present invention. Further, other general resins with an electrical insulating property can also be employed in the insert injection molding process according to the present invention.

Moreover, where failures of the PCM are generated, the PCM can be easily separated from the battery cell and then repaired. Since a battery cell and a circuit portion are separately prepared, productivity is improved. Furthermore, the PCM is molded separately from the battery cell, thereby solving stability problems of the battery generated when heat or physical pressure is applied to the battery cell where the battery cell and the PCM are simultaneously molded, and also preventing failures of products generated from a mold having a designated size for fixing the battery cell due to a tolerance of the size of the battery cell.

DESCRIPTION OF DRAWINGS

The above and other objects, features and other advantages of the present invention will be more clearly understood from the following detailed description taken in conjunction with the accompanying drawings, in which:

FIG. 5 is an assembled front view of the battery of FIG. 4;

FIG. 6 is an exploded perspective view of a battery in accordance with another embodiment of the present invention;

FIG. 7 is an exploded perspective view of the battery of FIG. 6 in a state in which leads of a PCM are attached to a protection circuit plate;

FIG. 8 is a perspective view of the bottom of a PCM insert injection mold of the battery of FIG. 6; and FIG. 9 is a perspective view of the top of the PCM insert injection mold of the battery of FIG. 7.

BEST MODE

Now, preferred embodiments of the present invention will be described in detail with reference to the annexed drawings. In some drawings, for aid of understanding and convenience of illustration, an insert injection mold is separated from a protection circuit board, connection terminals and leads thereof.

Figure 1:
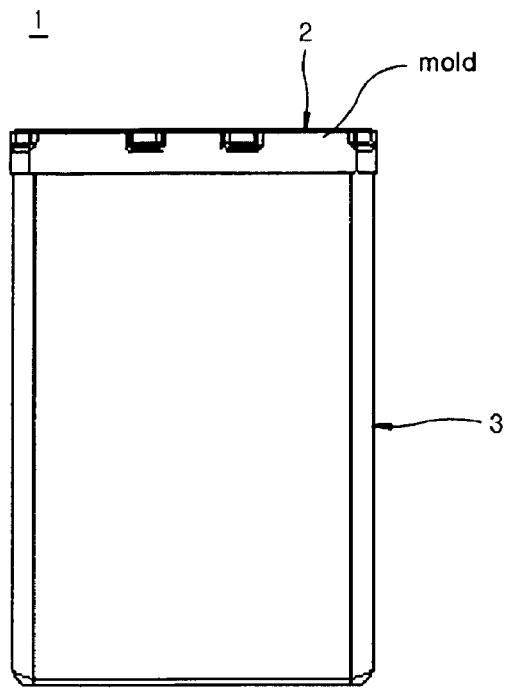
FIG. 1 is a front view of a conventional battery.
Figure 2:
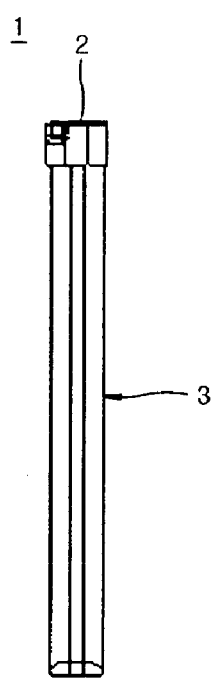
FIG. 2 is a side view of the conventional battery of FIG. 1.
Figure 3:
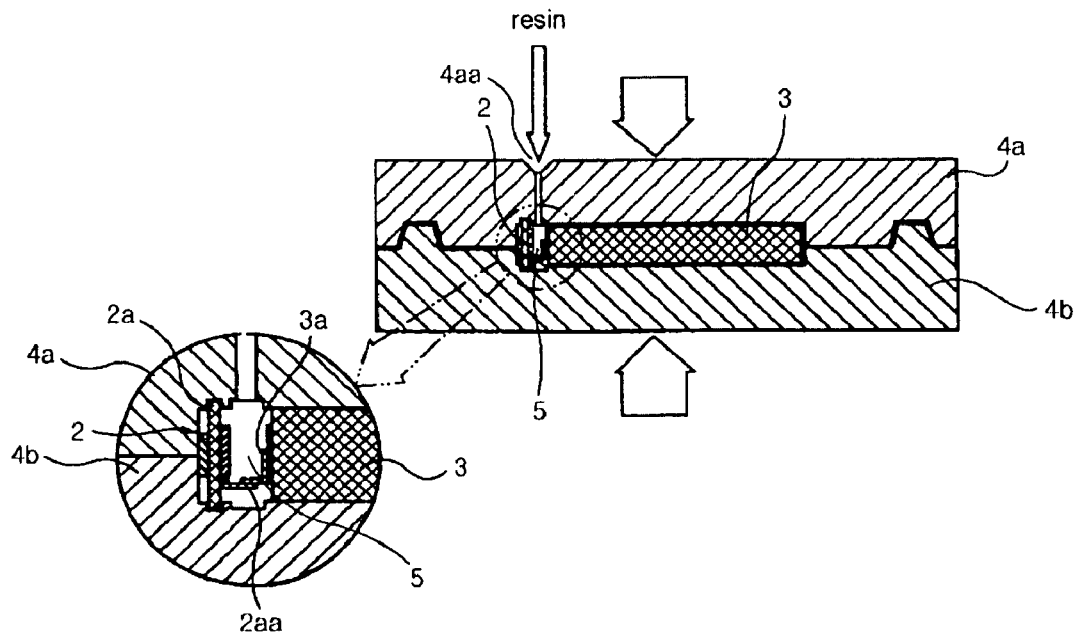
FIG. 3 is a longitudinal sectional view illustrating a step of locating a PCM and a battery cell in an inner space of a mold and performing insert injection molding by injecting a molten resin into the inner space of the mold and contains a partially enlarged view as indicated by a dotted circle.
Figure 4:
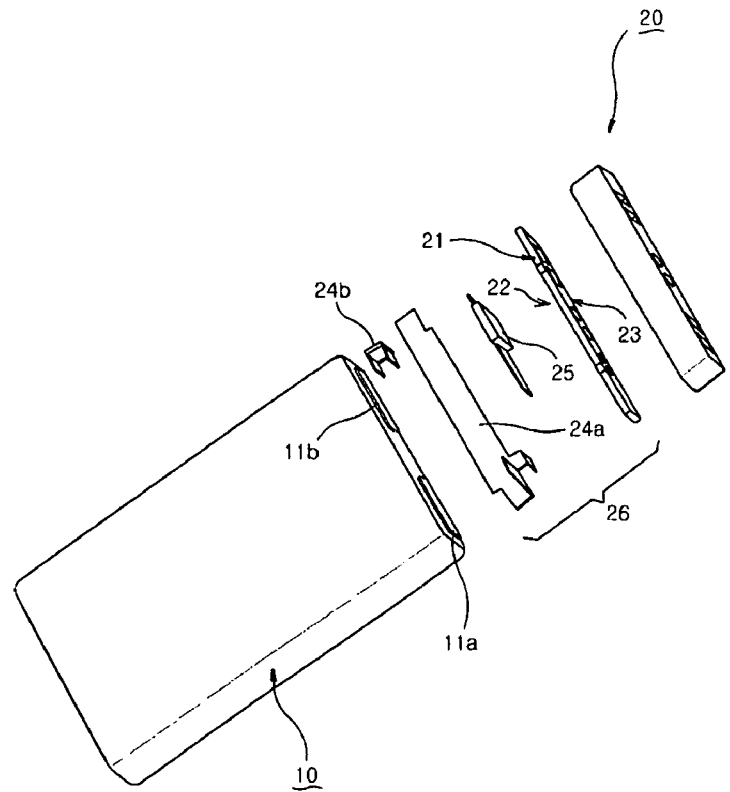
FIG. 4 is an exploded perspective view of a battery in accordance with one embodiment of the present invention.

FIG. 4 is an exploded perspective view of a battery in accordance with one embodiment of the present invention. With reference to FIG. 4, a battery cell 10, such as a lithium ion secondary cell, essentially includes a cathode terminal 11a and a anode terminal 11b, and optionally a safety valve (not shown).

The cathode terminal 11a may be an external can itself of the battery cell 10 which is generally made of aluminum, or a clad metal plate which is made of Al—Ni attached to the external can. On the other hand, the anode terminal 11b is a terminal having a protruded shape, and is electrically isolated from the external can by an insulator disposed at the circumference thereof. The safety valve is broken when external pressure is increased more than a designated value, thereby serving to discharge gas generated in the battery cell 10 to the outside.

A PCM insert injection mold 20 is formed under the condition that a PCM 26 is inserted thereinto. The PCM 26 essentially includes a protection circuit plate 21 provided with a protection circuit 22 formed thereon, and connection terminals 24a and 24b, and optionally a safety element 25.

The protection circuit plate 21 is made of a resin, and the protection circuit 22 is formed on the main surface of the protection circuit plate 21 for protecting the battery cell 10 from excessive charge and/or excessive discharge while the battery cell 10 is charged and/or discharged. The protection circuit 22 is electrically connected to the connection terminals 24a and 24b. Preferably, the protection circuit plate 21 has a rectangular shape of the size approximately corresponding to the top surface of the battery cell 10.

An external input/output terminal 23, or a connection cord connected to a connector is formed on the other surface of the protection circuit plate 21 opposite to the main surface of the protection circuit plate 21 on which the protection circuit 22 is formed. The protection circuit 22 and the external input/output terminal 23 are electrically connected to a hole (not shown) penetrating the protection circuit plate 21 in a thickness direction.

In order to more safely protect the battery from excessive charge and/or excessive discharge while the battery is charged and/or discharged, in addition to the protection circuit 22, the safety element 25 may be additionally mounted on the protection circuit 21. The safety cell 25 includes, for example, but is not limited to fuse, bimetal, PTC, etc. Preferably, PTC can be used as the safety cell 25 so as to rapidly cut off the flow of current where the temperature exceeds a designated range, to rapidly reopen the flow of the current where the temperature returns to the corresponding range, and to minimize the size of the battery.

Hereinafter, a method for preparation of a battery using the above-described insert injection mold 20 of the PCM 26 in accordance with a preferred embodiment of the present invention will be described.

First, an anode connection terminal 24b, to which the safety element 25 is optionally fixed, is fixed to a corresponding portion of one surface of the protection circuit plate 21 having the protection circuit 22 formed thereon, and an cathode nickel clad 24a is fixed to a corresponding portion of the other surface of the protection circuit plate 21, thereby preparing the PCM 26. The anode connection terminal 24b and the cathode nickel clad 24a are fixed to the corresponding portions of the protection circuit plate 21 by a physical or chemical connecting method using an adhesive, a molten resin supplied from a designated apparatus, or a male and female engagement structure or substance, or a welding method.

Then, the PCM 26 is placed in the inner space of a mold (not shown) separately from the battery cell 10, and a molten resin is injected into the inner space of the mold under the condition that the connection terminals 24a and 24b fixed to the protection circuit 21 are partially exposed to the outside, thereby making a PCM insert injection mold 20.

Separately from preparation of the PCM insert injection mold 20, the battery cell 10 is prepared. Then, the battery cell 10 is disposed such that the exposed portions of the connection terminals 24a and 24b of the PCM insert injection mold 20 are connected to the two terminals 11a and 11b of the battery cell 10, and at least one of the two connection terminals 24a and 24b is welded to the corresponding terminal 11a or 11b of the battery cell 10 by a welding tip of a spot welding machine (not shown) inserted into the inner space of the mold through openings of the upper surfaces of these connection terminals 24a and 24b of the PCM insert injection mold 20.

In a preferable embodiment, at least one of the connection terminals 24a and 24b is electrically connected to the corresponding terminal 11a or 11b of the battery cell 10 by the connection between the PCM insert injection mold 20 and the battery cell 10 without an additional welding step.

For example, one terminal, such as the cathode connection terminal 24a, of these connection terminals 24a and 24b, which are exposed from the mold 20, is connected to the corresponding terminal 11a of the battery cell 10, so that the other terminal, such as the anode connection terminal 24b, can be electrically connected to the corresponding terminal 11b by an elastic force, and also that the mold 20 can be integrally fixed to the battery cell 10 by means of welding force between the cathode terminal 24a and the corresponding terminal 11a. More specifically, as shown in FIG. 5, the cathode nickel clad 24a of the mold 20 wraps at least one external surface of the battery cell 10 serving as the cathode terminal, so as to electrically connect the mold 20 to the battery cell 10 and also more firmly physically fix the mold 20 to the battery cell 10, and is spot-welded to the external surface of the battery cell 10. As a result, the mold 20 and the battery cell 10 are not separated from each other by undesired external impact.

The connection between the mold 20 and the battery cell 10 is not necessarily achieved only by welding between the connection terminal 24a of the mold 20 and the battery cell 10. For example, the connection between the mold 20 and the battery cell 10 may be achieved by various methods, such as attachment using an adhesive, attachment using a molten resin, and connection using locking members formed respectively on the mold 20 and the battery cell 10, which should be interpreted to be included within the scope of the present invention.

FIG. 6 is an exploded perspective view of a battery in accordance with another embodiment of the present invention, and FIG. 7 is an exploded perspective view of the battery of FIG. 6 in a state in which leads of a PCM are attached to a plate thereof. The same reference numerals of FIGS. 6 and 7 as those of FIG. 4 denote the same elements.

With reference to FIGS. 6 and 7, the battery further comprises leads 28a and 28b for facilitating the electrical connections between the cathode terminal 11a and anode terminal 11b of the battery cell 10 and connection terminals 27a and 27b of the protection circuit plate 21 and also strengthening the mechanical connections therebetween by welding. However, in any case, the connection terminals 27a and 27b and the leads 28a and 28b may be integrated with each other.

The shape and number of the leads 28a and 28b are not limited as far as the connection terminals 27a and 27b of the protection circuit plate 21 are electrically connected to the corresponding terminals 11a and 11b of the battery cell 10 via the leads 28a and 28b. Particularly, the connection terminals 27a and 27b and the leads 28a and 28b contained in the mold 20 may have various shapes so as to strengthen the connections with the cathode and anode terminals 11a and 11b of the battery cell 10.

Connection terminals for a protection circuit are obtained by mounting the connection terminals 27a and 27b on the protection circuit plate 21 by surface mount technology (SMT). Preferably, the connections between the leads 28a and 28b and the connection terminals 27a, 27b, 11a, and 11b may be achieved by welding, such as spot welding or laser welding. However, as described above, such connections are not limited thereto, but may be achieved by any electrical connection method. For example, the connections between the leads 28a and 28b and the connection terminals 27a, 27b, 11a, and 11b may be achieved by physical or chemical connection between the battery cell 10 and the mold 20.

The connection terminals 27a and 27b and the leads 28a and 28b of the PCM may be made of nickel, or Al—Ni clad metal. Since Al—Ni clad metal has a high adhesive force when the connection terminals 27a and 27b and the leads 28a and 28b directly contact an external can of the battery cell 10, it is preferable that the connection terminals 27a and 27b and the leads 28a and 28b are made of Al—Ni clad metal.

External input/output terminals 23a and 23b are formed on the other surface of the protection circuit plate 21, and are electrically connected to the protection circuit by holes penetrating the protection circuit plate 21 in a thickness direction.

The method for preparation of the protection module insert injection mold of FIG. 6 is the same as that of FIG. 4 except that the leads 28a and 28b are contained in the protection module insert injection mold of FIG. 6. More specifically, the PCM including the protection circuit plate 21 having the protection circuit formed thereon, the connection terminals 27a and 27b, and the leads 28a and 28b, which are sequentially connected thereto, is inserted into the inner space of a mold (not shown), and a molten resin is injected into the inner space with the leads 28a and 28b being partially exposed to the outside. Then, the protection module insert injection mold is formed by injection molding. Here, the protection circuit plate 21, to which the connection terminals 27a and 27b and the leads 28a and 28b are temporarily connected by welding (for example, spot welding), may be installed in the mold, or the protection circuit plate 21, the connection terminals 27a and 27b, and the leads 28a and 28b without temporary connection may be installed at designated positions in the mold. The protection circuit plate 21 having the protection circuit formed thereon, the connection terminals 27a and 27b, and the leads 28a and 28b are fixed and sealed by solidifying the molten resin.

When the mold 20 is formed by insert injection molding, parts of the leads 28a and 28b and at least parts of the external input/output terminals 23a and 23b are isolated from the molten resin in the inner space of the mold, thereby not being coated with the molten resin.

FIGS. 8 and 9 are perspective views respectively illustrating the bottom and top of the PCM insert injection mold made by the above method. As shown in FIG. 8, parts of the leads 28a and 28b are exposed from the bottom of the mold 20 such that cathode and anode terminals of the battery cell are connected to the exposed parts of the leads 28a and 28b. On the other hand, in the structure without the leads 28a and 28b, parts of the connection terminals (27a and 27b of FIGS. 6 and 7) are exposed from the bottom of the mold 20.

With reference to FIGS. 6 and 7 again, a battery of the present invention is made by attaching the PCM insert injection mold 20 to the battery cell 10 including the cathode terminal 11a which is an external can made of aluminum, and the anode terminal 11b which is a terminal of a protruded shape. The above method for preparation of the battery will be described, as follows.

First, a cathode clad metal plate 12 made of Al—Ni and an insulating member 13 (for example, an insulating double-sided adhesive tape or an insulating adhesive) are attached to the external can.

Then, a bimetal mold block 15 containing a bimetal 14 as a safety element is mounted on the insulating member 13, and is electrically connected to the anode terminal 11b. The bimetal mold block 15 serves to electrically isolate the anode terminal 11b from other components as well as to electrically connect the anode terminal 11b to the bimetal 14, and also serves as an intermediate connector for fixing the battery cell 10 and the injection mold 20 at an exact position. Then, a lead 16a is attached to the cathode clad metal plate 12, and a lead 16b is attached to the corresponding exposed portion of the bimetal 14.

Next, the PCM insert injection mold 20 (FIG. 8) is placed at a designated position. The parts of the leads 28a and 28b, which are exposed from the mold 20, are electrically connected to the corresponding leads 16a and 16b by welding. For example, the leads 28a and 28b of the PCM have inverted L shapes such that the inverted L-shaped vertically bending portions of the leads 28a and 28b are exposed to the outside. The inverted L-shaped vertically bending portions of the leads 28a and 28b and L-shaped vertically bending portions of the leads 16a and 16b of the battery cell surface-contact each other and then are welded. Since the contact portions between the inverted L-shaped vertically bending portions of the leads 28a and 28b and the L-shaped vertically bending portions of the leads 16a and 16b are exposed to the outside through a side opening 20a of the mold 20 (FIG. 8), the contact portions are welded using a welding tip (not shown) inserted into the side opening 20a, and then the side opening 20a is closed by inserting side caps 31 thereinto.

A bottom cap 32 is attached to the battery cell 10, and a label 33 is wrapped around the battery cell 10. Finally, a test point label 34 is attached to the portions 29, which expose test points 23c of the protection circuit plate 21 to the outside. Thereby, the manufacture of the battery of the present invention is completed.

In another embodiments, an adhesive may be used so as to strengthen the physical connection between the PCM insert injection mold and the battery cell, or the shapes of the connected terminals or leads may be deformed so as to increases the dimensions of the terminals or leads.

The present invention may be applied to various types of batteries, and is preferably applied to a lithium ion secondary battery or a lithium ion polymer battery.

INDUSTRIAL APPLICABILITY

As apparent from the above description, the present invention provides a protection circuit module (PCM) insert injection mold and a battery having the same, in which a PCM is prepared by insert injection molding under the condition that a protection circuit and the battery cell are not connected, i.e., that power is not applied to a battery, so that the PCM can be molded using general resins, is electrically stable, does not require a coating step for preventing short circuits, and is rare electrically damaged. Further, where failures of the PCM are generated, the PCM is easily separated from the battery and then repaired. A battery cell and a circuit portion are separately prepared, thus the productivity can be improved. Moreover, the PCM is molded separately from the battery cell, thereby solving stability problems of the battery generated when heat or physical pressure is applied to the battery cell in case where the battery cell and the PCM are simultaneously molded, and preventing failures of products generated from a mold having a designated size for fixing the battery cell due to a tolerance of the size of the battery cell.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for preparation of a battery comprising:
   preparing a protection circuit module (PCM) insert injection mold separate from a battery cell,
   the protection circuit module (PCM) insert injection mold prepared by inserting a PCM, including a plate having a protection circuit formed thereon and connection terminals and optionally leads, with the protection circuit plate, connection terminals and leads being electrically connected, into an inner space of a mold, and injecting a molten resin into the inner space of the mold such that the leads are partially exposed to the outside where the PCM includes the leads, or such that the connection terminals are partially exposed to the outside where the PCM does not include the leads; and
   directly connecting the exposed parts of the connection terminals to the corresponding electrode terminals of the battery cell, or connecting the connection terminals to the corresponding electrode terminals of the battery cell via the leads of which are partially exposed from the bottom of the PCM insert injection mold,
   wherein a battery is formed only when the PCM insert injection mold is mounted on the battery cell, and then the connection terminals or leads of the PCM insert injection mold are directly connected to the battery cell.

2. The method for preparation of a battery according to claim 1, wherein one of the two connection terminals wraps at least one external surface of the battery cell so as to electrically connect the connection terminal of the mold to the battery cell and also more firmly fix the mold to the battery cell, and the connection terminal is physically connected to the external surface of the battery cell when the mold is connected to the battery cell.

3. The method for preparation of a battery according to claim 2, wherein the physical connection is achieved by welding, attachment using an adhesive, attachment using a molten resin, or locking members between the mold and the battery cell.

4. The method for preparation of a battery according to claim 1, wherein the protection circuit plate to which the connection terminals and the leads are temporarily connected is installed in the mold, or the protection circuit plate, connection terminals and leads are installed without temporary connection at designated positions in the mold, followed by insert injection molding.

5. The method for preparation of a battery according to claim 1, wherein the connection terminals or the leads are made of a clad metal plate.

6. The method for preparation of a battery according to claim 1, wherein the battery is a lithium ion secondary battery or a lithium ion polymer secondary battery.

\* \* \* \* \*